US008874469B2

(12) United States Patent
Smith et al.

(10) Patent No.: US 8,874,469 B2
(45) Date of Patent: Oct. 28, 2014

(54) GLITCH FREE DYNAMIC VIDEO AD INSERTION

(75) Inventors: Derek H. Smith, Snohomish, WA (US); Simon P. Atwell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1197 days.

(21) Appl. No.: 12/039,041

(22) Filed: Feb. 28, 2008

(65) Prior Publication Data
US 2009/0222332 A1    Sep. 3, 2009

(51) Int. Cl.
*G06Q 30/00*  (2012.01)
*G06Q 30/02*  (2012.01)
(52) U.S. Cl.
CPC ............ *G06Q 30/02* (2013.01); *G06Q 30/0276* (2013.01)
USPC ......................................................... 705/14.4
(58) Field of Classification Search
None
See application file for complete search history.

(56) References Cited

U.S. PATENT DOCUMENTS

| | | | | |
|---|---|---|---|---|
| 5,027,400 | A * | 6/1991 | Baji et al. ....................... | 725/116 |
| 5,915,094 | A * | 6/1999 | Kouloheris et al. ............ | 709/219 |
| 6,704,930 | B1 | 3/2004 | Eldering et al. ................ | 725/36 |
| 7,017,173 | B1 * | 3/2006 | Armstrong et al. ............. | 725/87 |
| 7,742,504 | B2 * | 6/2010 | Zimmermann et al. ........ | 370/487 |
| 2001/0023436 | A1 * | 9/2001 | Srinivasan et al. ............. | 709/219 |
| 2002/0176418 | A1 * | 11/2002 | Hunt et al. ...................... | 370/389 |
| 2004/0103429 | A1 * | 5/2004 | Carlucci et al. ................. | 725/32 |
| 2005/0076357 | A1 | 4/2005 | Fenne .............................. | 725/14 |
| 2006/0107302 | A1 * | 5/2006 | Zdepski .......................... | 725/135 |
| 2006/0242016 | A1 | 10/2006 | Chenard ......................... | 705/14 |
| 2007/0022032 | A1 | 1/2007 | Anderson et al. ............... | 705/35 |
| 2007/0061201 | A1 | 3/2007 | Ellis et al. ....................... | 705/14 |
| 2007/0100695 | A1 | 5/2007 | Seet et al. ....................... | 705/14 |
| 2007/0157231 | A1 | 7/2007 | Eldering et al. ................ | 725/35 |
| 2007/0204310 | A1 | 8/2007 | Hua et al. ........................ | 725/88 |
| 2007/0226761 | A1 | 9/2007 | Zalewski et al. ............... | 725/32 |

FOREIGN PATENT DOCUMENTS

WO   WO 2005/086865 A2   9/2005
WO   WO 2005/086865 A3   9/2005

OTHER PUBLICATIONS

Riley, D., "Kiptronic Adds Advertising Insertion for Video", Jun. 26, 2007, Downloaded from Internet Nov. 1, 2007, 5 pages, http://www.techcrunch.com.
RGB Networks, White Paper, Digital Program Insertion: Meeting the Technology and Cost Challenges of Delivering Highly Targeted and Personalized Video Services, 2006, 10 pages http://www.broadcastpapers.com.
Dynamic Video Ad Insertion, 2005, Downloaded from Internet Nov. 1, 2007, 2 pages, http://www.whatiwantpodcasting.com.

* cited by examiner

*Primary Examiner* — Jason M Borlinghaus
(74) *Attorney, Agent, or Firm* — Aaron Chatterjee; Andrew Sanders; Micky Minhas

(57) ABSTRACT

Techniques for dynamically and seamlessly inserting secondary content via a second video pipeline into the playing of principal content over a first video pipeline are disclosed herein. One aspect of the techniques may involve the file containing the principal content be contiguous instead of being in a plurality of separate sections. The secondary content is able to be pre-processed on the second video pipeline while the principal content is played over the first video pipeline. This enables the secondary content to be available instantaneously upon the pausing of the principal content at various designated points therein. Playing of the principal content may likewise be instantaneous upon completion of the time period for the specified pausing thereof. Since the file containing the principal content is preferably contiguous, rewinding the principal content to a previous point does not require reloading.

17 Claims, 5 Drawing Sheets

GLITCH FREE DYNAMIC VIDEO AD INSERTION

BACKGROUND

A number of devices currently exist for playing ad-supported video, which is a video file that includes principal content downloaded or streamed from an external source such as a server, and, when viewed, has secondary content (e.g., video advertisements) spliced into the principal content. The ads may be inserted either at ingestion time or automatically by a player during playback. The former is referred to as "static," while the latter is "dynamic." Ingestion is the process of receiving a video from a studio or production facility and encoding, packaging or otherwise preparing it for digital distribution. During playback, a video player may detect that a video is either static or dynamic ad-supported content by, for example, looking for key attributes in the file header. In the case of dynamic ad based content, the file header may contain some number of markers that indicate where the ads should be spliced in. This is typically done at the same point that a television broadcaster would insert a commercial, and usually defined by the studio that produced the video.

Most Internet broadcasts that include dynamic advertising segment the principal content in order to create a playlist of items, some of which are the video and some of which are ads. An example playlist might be as follows:
1. Chapter 1 (0:00:00 to 0:05:00)
2. Ad 1
3. Ad 2
4. Chapter 2 (0:05:00 to 0:13:00)
5. Ad 3
6. Ad 4
7. Chapter 3 (0:13:00 to 0:19:00)
8. Ad 5
9. Ad 6
10. Chapter 4 (0:19:00 to 0:22:00)

One problem related to conventional broadcasts is that, after completing playing of one of the principal content items (e.g., Chapter 1), there is typically a pause or latency period during which the next secondary content item (e.g., Ad 1) is processed for playing. Other pause or latency periods may then occur during which the subsequent secondary content item (e.g., Ad 2) and the subsequent primary content item (e.g., Chapter 2) are processed for playing. Another problem is that, when reversing the primary content from a point in a subsequent content item (e.g., Chapter 2) to a point in a previous content item (e.g., Chapter 1), there is typically a pause or latency period during which the previous primary content item is re-processed for re-play.

SUMMARY

Techniques for dynamically and seamlessly inserting secondary content via a second video pipeline into the playing of principal content over a first video pipeline are disclosed herein. In particular, one aspect of the techniques may involve the file containing the principal content being contiguous instead of being in a plurality of separate sections. The secondary content may be pre-processed on the second video pipeline while the principal content is played over the first video pipeline. This enables the secondary content to be available instantaneously upon the pausing of the principal content at various designated points therein. Playing of the principal content may likewise be instantaneous upon completion of the time period for the specified pausing thereof.

Another aspect of the technique involves the reversing and replaying of the principal content. Since the file containing the principal content is preferably contiguous, rewinding the principal content to a previous point does not require reloading. In addition, the principal content need not be paused at any of the markers where the secondary content has been previously played.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
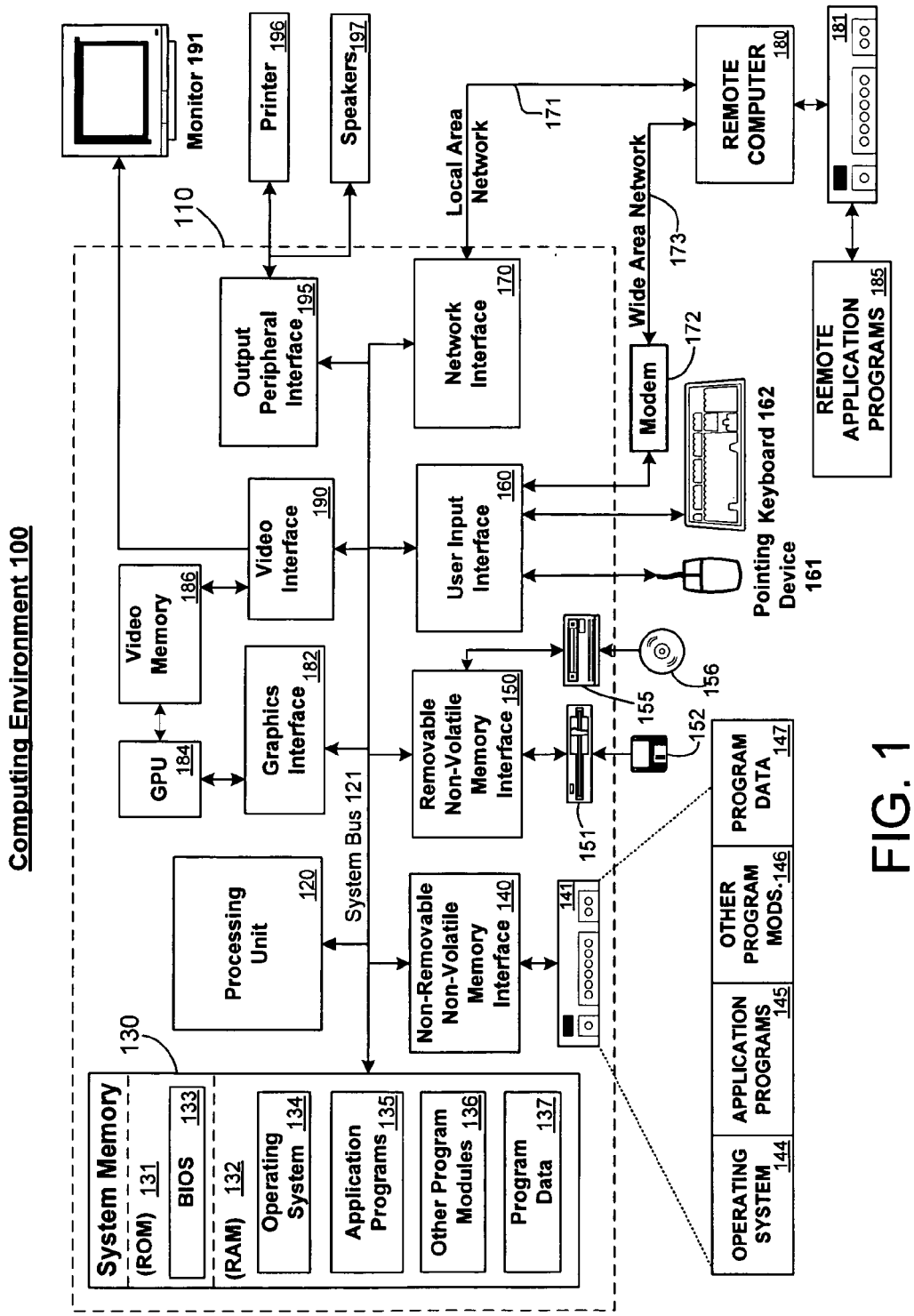
FIG. 1 is a block diagram of an exemplary computing device.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
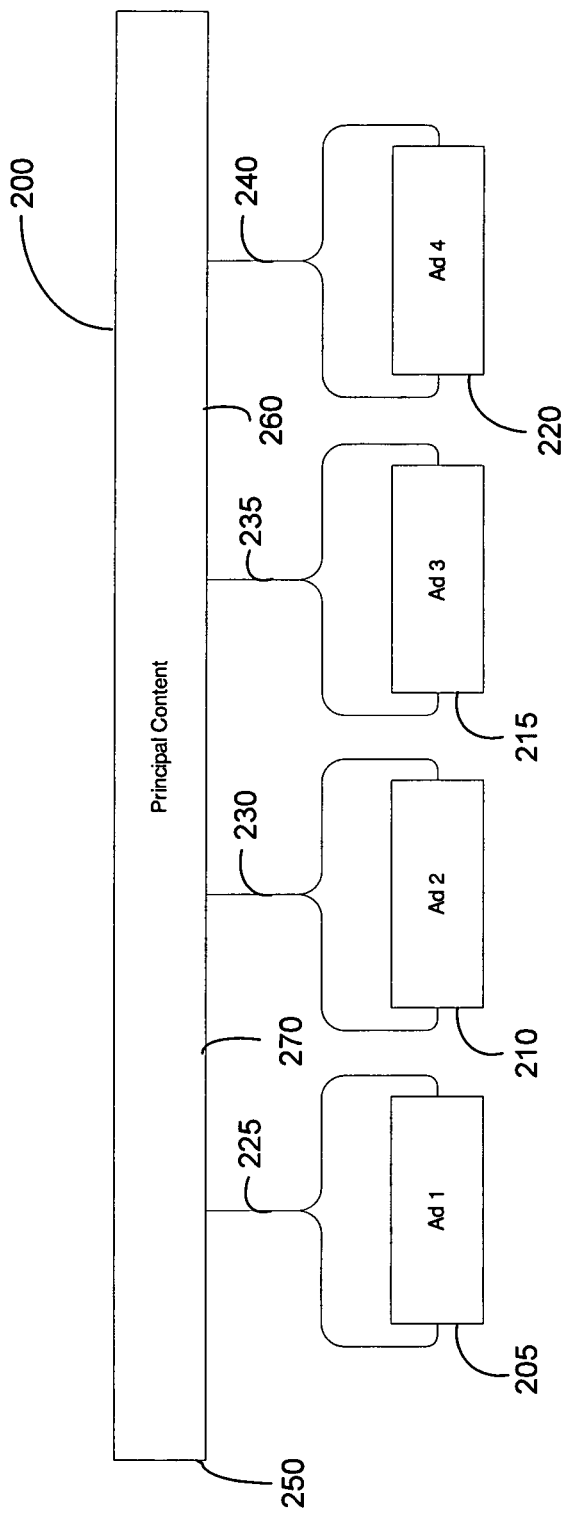
FIG. 2 is a schematic diagram depicting the dynamic insertion of video ads within principal content.

One function of computer 110 is preferably to play videos or other media which may be downloaded or streamed from an Internet server (e.g., by a video player) or another suitable device. Such videos typically will include a video file (otherwise known herein as principal content) and advertisements (otherwise known herein as secondary content) interspersed therein. Contrary to the format of previous broadcasts, where the principal content has been divided into segments or chunks with separate files of secondary content provided therebetween, it is preferred that the principal content be contiguous or continuous file 200 (as shown in FIG. 2). It will be understood that the principal content is provided to the video player (computer 110) by means of a first video pipeline. In order to accomplish this, the secondary content (e.g., ads 205, 210, 215 and 220) is preferably inserted dynamically via a second video pipeline to the video player at various markers 225, 230, 235 and 240, respectively, within the principal content file 200. Each marker is typically a specified time index of principal content file 200 which causes the video from the first video pipeline to be paused for a specified time period. Accordingly, the secondary content from the second video pipeline is played by the video player while the principal content is paused. This enables the seamless playing of principal and secondary content by the video player without the glitches experienced previously.

Figure 3:
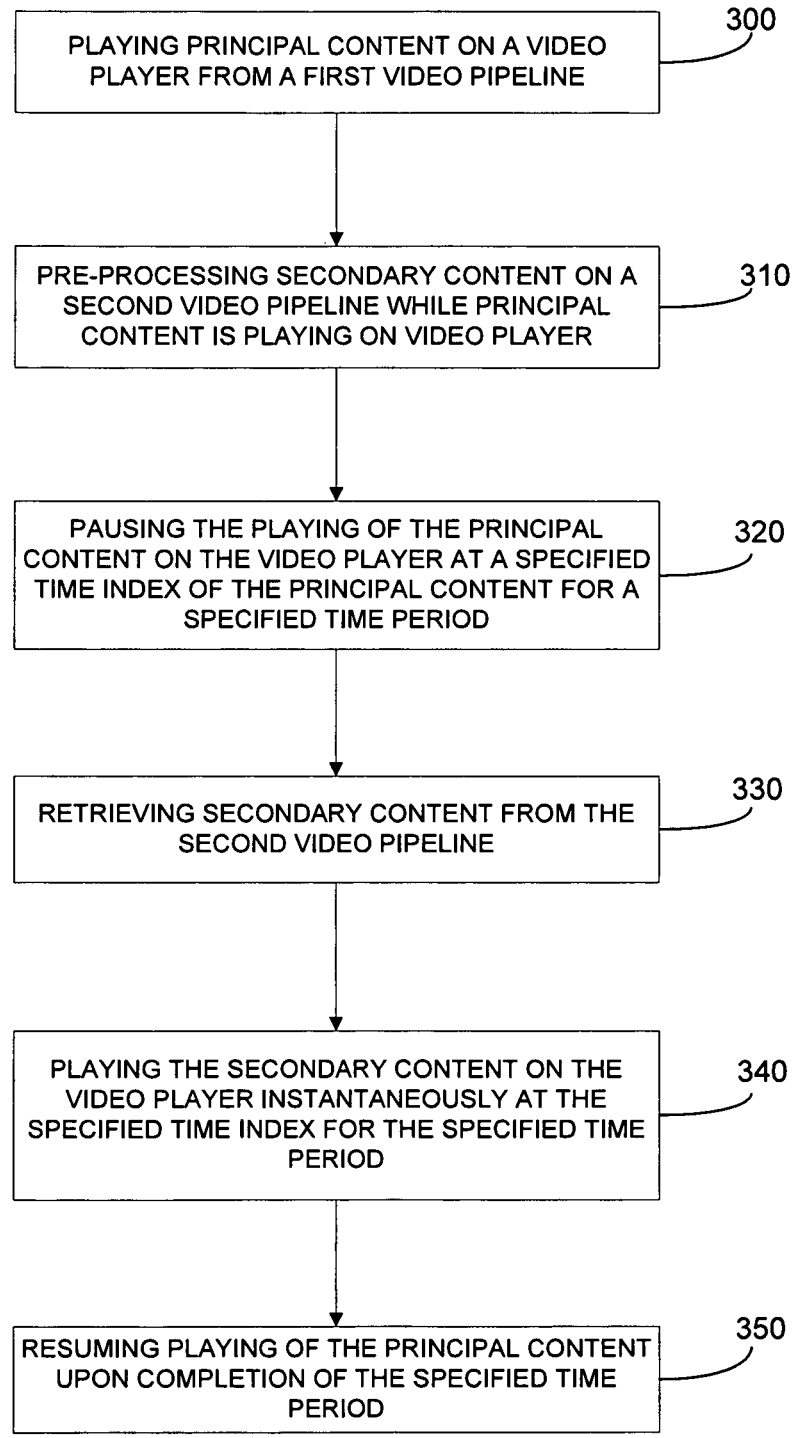
FIG. 3 is a flow chart depicting the process steps for dynamically inserting secondary content within principal content.

It will be seen that FIG. 3 further explains the process for dynamically inserting secondary content into the principal content of videos played by computer 110. As noted herein, principal content is played on a video player from a first video pipeline (box 300). While the principal content is playing on the video player, it is preferred that secondary content (i.e., at least one and preferably several ads) be pre-processed concurrently on a secondary video pipeline (box 310). By preparing the secondary content in parallel, the secondary content is always ready to be played when the secondary video pipeline is accessed. At certain designated points of principal content file 200, playing of the principal content on the video player is paused (box 320). These designated points, which are markers or certain time indexes on principal content file 200, preferably indicate a specified time period in which the pausing of principal content occurs. Upon pausing of the principal content provided by the first video pipeline, it is preferred that the secondary content (e.g., at least one and possibly a plurality of ads or other items) from the secondary video pipeline be retrieved and played (box 330). In order to provide a seamless experience for the user, such secondary content is preferably played instantaneously on the video player at the specified time index for the specified time period (box 340). Upon completion of the specified time period, playing of the secondary content from the second video pipeline is discontinued and playing of the principal content via the first video pipeline is resumed (box 350).

Figure 4:
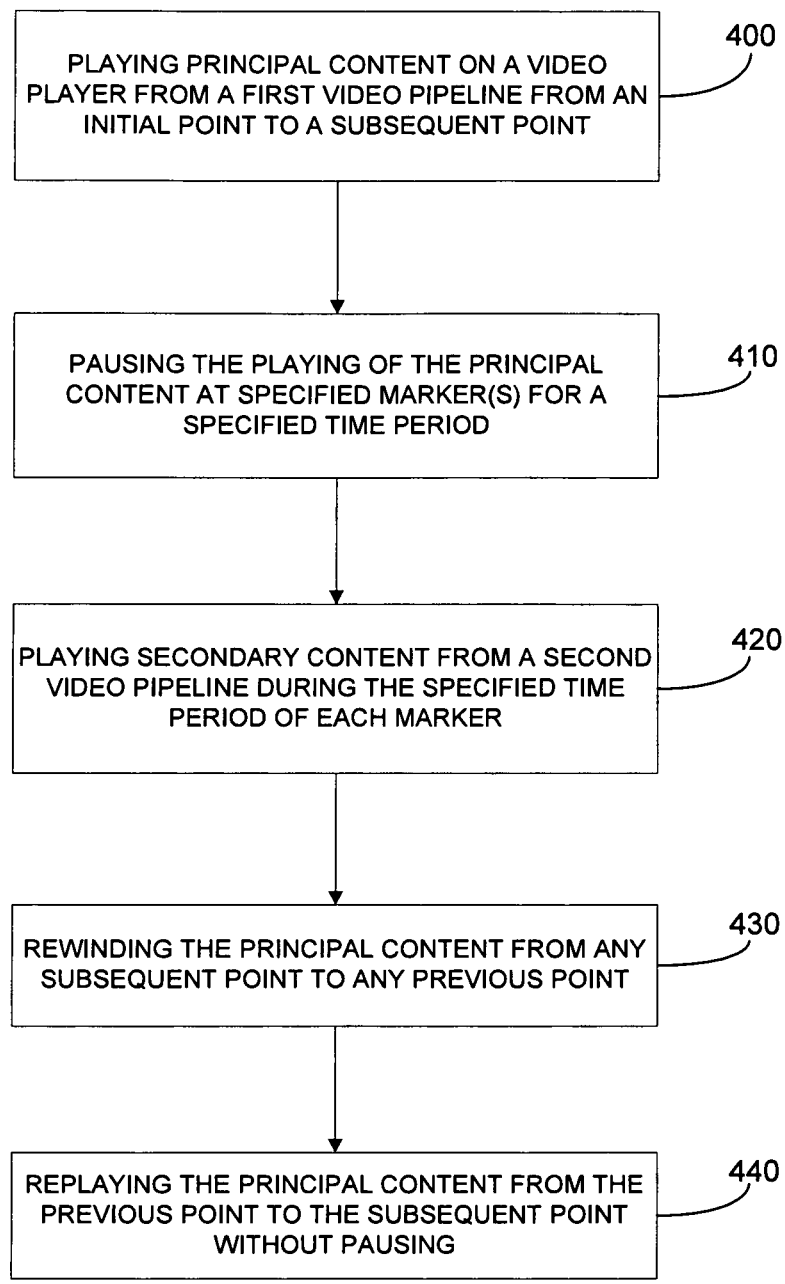
FIG. 4 is a flow chart depicting the process steps for generating principal content in a contiguous file that permits dynamic insertion of secondary content; and, FIG. 5 is a flow chart depicting the process steps for replaying principal content with secondary content dynamically inserted therein.

Besides having the ability to play principal and secondary content in a seamless manner, formatting the principal content file 200 in the described manner has additional benefits. One such benefit involves the reversing and replaying of such principal content without the need to reload the principal content. In addition, the principal content may be replayed without the insertion of previously viewed secondary content. Referring to FIG. 2, principal content is played on a video player from a first video pipeline from an initial point 250 to a subsequent point 260. This process step is identified in box 400 of FIG. 4. It will be appreciated that playing of the principal content is paused at specified markers 225, 230, and 235 between initial point 250 and subsequent point 260 of principal content file 200 (box 410) so that secondary content 205, 210 and 215 may be played from a second video pipeline for the specified time period of each marker (box 420). Thereafter, it will be appreciated that the principal content may be reversed or rewound from subsequent point 260 to any previous point in principal content file 200 (box 430). For example, suppose the principal content file 200 was reversed to a previous point 270 therein and replayed therefrom (box 440). Not only would the principal content be replayed without the need for reloading (due to the contiguous nature of principal content file 200), but the principal content could be played from previous point 270 up to subsequent point 260 (i.e., the farthest point at which the principal content was played) without being paused for the replaying of secondary content 210 and 215. Of course, the reversing and replaying process described can be performed any number of times with differing initial points, subsequent points, and previous points.

Figure 5:
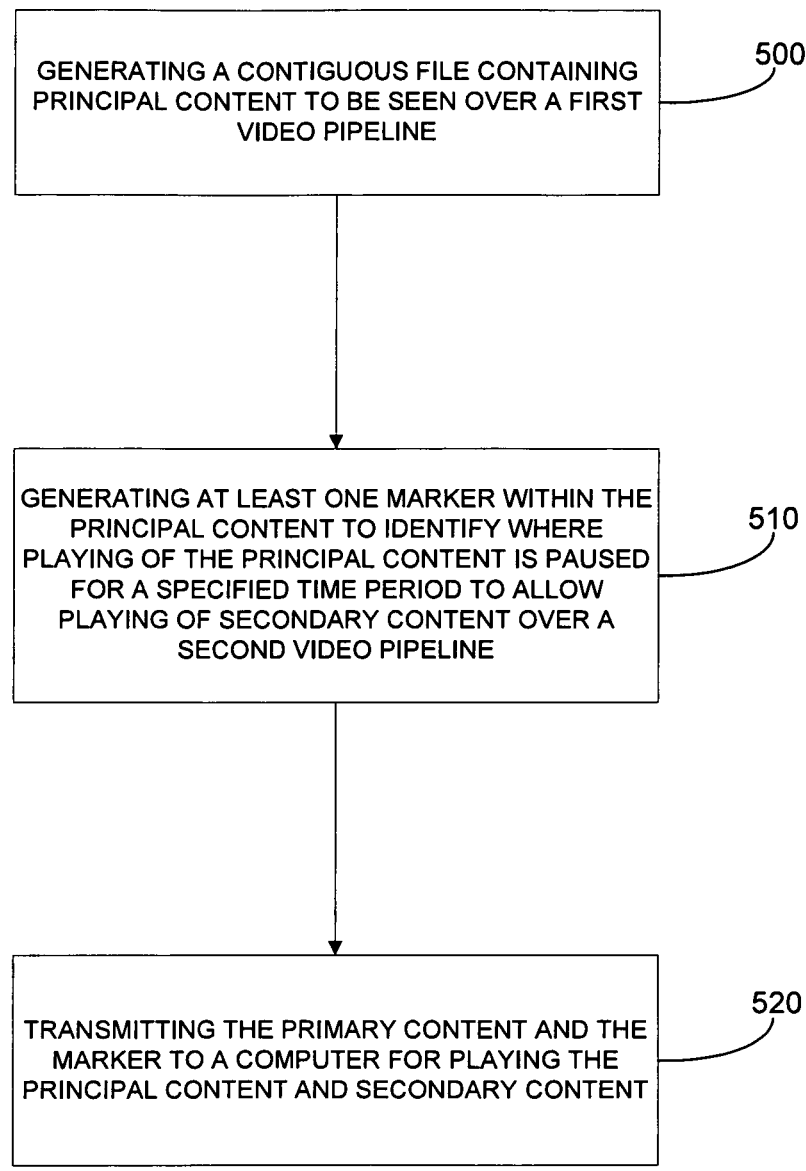

Another aspect of the present invention involves the generation and transmission of principal content file 200 to a video player, the process for which is depicted in FIG. 5. As described therein, it is preferred that file 200 be generated in a contiguous manner and contain principal content which is to be seen over a first video pipeline (box 500). It is also preferred that at least one point be generated within the principal content at which playing of the principal content is to be paused in order to play secondary content (box 510). This point may be a marker or time index within the principal content stored in a header of file 200. It is also possible that the identification point may be stored in an additional file separate from the principal content. Thereafter, the primary content and the identification point or marker is transmitted to a computer or other video player for playing the principal content and secondary content (box 520).

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer readable storage device having stored thereon computer-executable instructions for performing a process comprising:
    receiving, by a playing device, principal content using a first video pipeline, the principal content associated with at least one video file that is transmitted to the playing device;
    playing the principal content;
    receiving, by the playing device, secondary content using a second video pipeline;
    while playing the principal content received by the playing device using the first video pipeline, pre-processing the secondary content by the playing device;
    pausing the playing of the principal content at a first point indicated in the at least one video file transmitted to the playing device at which to insert the secondary content by the playing device;
    playing the secondary content;
    after completing the playing of the secondary content, resuming the playing of the principal content;
    reversing the principal content from a second point subsequent to the first point in the principal content to a third point prior to the first point in the principal content; and
    replaying the principal content from the third point to the second point without replaying the secondary content that was previously played at the first point indicated in the at least one video file transmitted to the playing device at which to insert the secondary content by the playing device.

2. The computer readable storage device of claim 1, wherein the secondary content is an ad.

3. The computer readable storage device of claim 1, wherein the secondary content comprises a plurality of secondary content items.

4. The computer readable storage device of claim 1, wherein the secondary content is played instantaneously after pausing the principal content without any latency.

5. The computer readable storage device of claim 1, wherein the principal and secondary content is streaming media content.

6. The computer readable storage device of claim 1, wherein the principal content can be reversed from any subsequent point in the playing of the principal content to any previous point in the playing of the principal content without experiencing a pause due to reloading the principal content.

7. A method for playing of content comprising:
- receiving, by a playing device, principal content using a first video pipeline, the principal content associated with at least one video file that is transmitted to the playing device;
- playing the principal content;
- receiving, by the playing device, secondary content using a second video pipeline;
- while playing the principal content received by the playing device using the first video pipeline, pre-processing the secondary content by the playing device;
- pausing the playing of the principal content at a first point indicated in the at least one video file transmitted to the playing device at which to insert the secondary content by the playing device;
- playing the secondary content;
- after completing the playing of the secondary content, resuming the playing of the principal content;
- reversing the principal content from a second point subsequent to the first point in the principal content to a third point prior to the first point in the principal content; and
- replaying the principal content from the third point to the second point without replaying the secondary content that was previously played at the first point indicated in the at least one video file transmitted to the playing device at which to insert the secondary content by the playing device.

8. The method of claim 7, wherein the secondary content is an ad.

9. The method of claim 7, wherein the secondary content comprises a plurality of secondary content items.

10. The method of claim 7, wherein the primary and secondary content are streaming media content.

11. The method of claim 7, wherein the principal content can be reversed from any subsequent point in the playing of the principal content to any previous point in the playing of the principal content without experiencing a pause due to reloading the principal content.

12. A system for playing of content comprising:
one or more processors; and
memory having stored therein instructions that, upon execution by the one or more processors, cause the system to perform operations comprising:
- receiving principal content using a first video pipeline, the principal content associated with at least one video file that is transmitted to the system;
- playing the principal content;
- receiving secondary content using a second video pipeline;
- while playing the principal content received by the system using the first video pipeline, pre-processing the secondary content;
- pausing the playing of the principal content at a first point indicated in the at least one video file transmitted to the system at which to insert the secondary content by the system;
- playing the secondary content;
- after completing the playing of the secondary content, resuming the playing of the principal content;
- reversing the principal content from a second point subsequent to the first point in the principal content to a third point prior to the first point in the principal content; and
- replaying the principal content from the third point to the second point without replaying the secondary content that was previously played at the first point indicated in the at least one video file transmitted to the system at which to insert the secondary content by the system.

13. The system of claim 12, wherein the secondary content is an ad.

14. The system of claim 12, wherein the secondary content comprises a plurality of secondary content items.

15. The system of claim 12, wherein the secondary content is played instantaneously after pausing the principal content without any latency.

16. The system of claim 12, wherein the principal and secondary content is streaming media content.

17. The system of claim 12, wherein the principal content can be reversed from any subsequent point in the playing of the principal content to any previous point in the playing of the principal content without experiencing a pause due to reloading the principal content.

* * * * *